Figure 1:
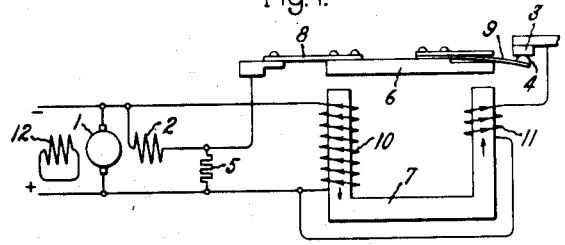

Nov. 26, 1935.    B. M. CAIN    2,022,536

ELECTRICAL REGULATING SYSTEM

Filed March 3, 1934

Inventor:
Bernard M. Cain,
by  Harry E. Dunham
His Attorney.

Patented Nov. 26, 1935

2,022,536

UNITED STATES PATENT OFFICE 2,022,536

ELECTRICAL REGULATING SYSTEM

Bernard M. Cain, Ballston Lake, N. Y., assignor to General Electric Company, a corporation of New York Application March 3, 1934, Serial No. 713,897

6 Claims. (Cl. 171—229)

My invention relates to electrical regulating systems and more particularly to improvements in the anti-hunting feature of electrical regulating systems.

The particular defect in the anti-hunting feature of electrical regulating systems which my invention overcomes is the calibration changing effect produced by anti-hunting means of the type whose average energization is variable. By calibration changing effect is meant the change in the value of the regulated condition or quantity produced by changes in the average value of the energization of the anti-hunting means as an indirect result of changes in primary conditions which would cause changes in the regulated condition were it unregulated. In automatic regulating systems of the vibratory contact type this effect usually produces the so-called under-compounding effect whereby the regulator holds a drooping voltage with increases in load, for example, on a generator whose voltage is being controlled by the regulating system.

Although my invention is not necessarily limited to any particular type of electrical regulating system, or to any particular type of anti-hunting means for regulators, other than they must be anti-hunting means of the type whose average energization is ordinarily variable, my invention was developed in connection with vibratory contact type voltage regulators for automobile generators and consequently in the following detailed description I will illustrate and describe my invention as applied to regulators of this type.

Many electrical regulators control the average value of the current in an inductive circuit, such for example, as the field winding circuit of a dynamo-electric machine, and in accordance with my invention, I provide an auxiliary circuit which is inductively coupled to the circuit controlled by the regulator and which auxiliary circuit is permanently closed and has a substantially constant resistance. In the case of a regulated dynamo-electric machine the auxiliary circuit takes the form of an auxiliary turn or field winding, which is linked by the main flux of the machine. As can be explained by the theorum of constant flux linkages, which is well known to those skilled in the electrical art, the effect of such an auxiliary turn or winding is to permit the current in the main field winding circuit to change at a much more rapid rate than changes in flux with the result that when a generator which is so provided is controlled by a vibratory regulator the maximum and minimum field current values are substantially the same regardless of the average value of field current. This will be more clearly explained hereinafter in connection with the detailed description of the illustrated embodiment of my invention wherein it will also be shown that it results in an improved action of the usual anti-hunting means.

An object of my invention is to provide a new and improved electrical regulating system.

A further object of my invention is to provide a new and improved anti-hunting system for electrical regulating systems.

An additional object of my invention is to provide a new and improved vibratory contact type regulating system.

My invention will be better understood from the following description taken in connection with the accompanying drawing, and its scope will be pointed out in the appended claims.

Figure 2:
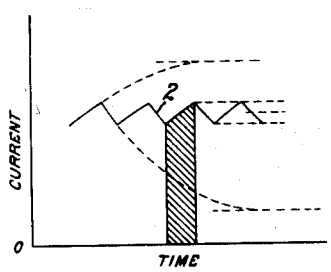
Figure 3:
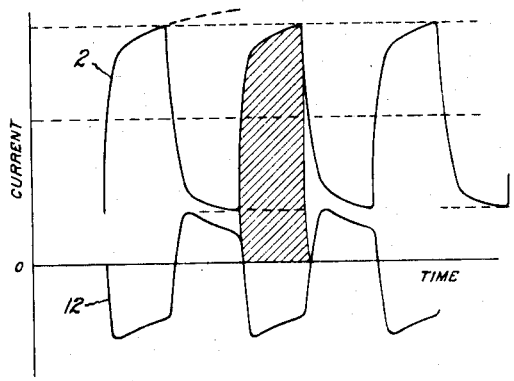
Figure 4:
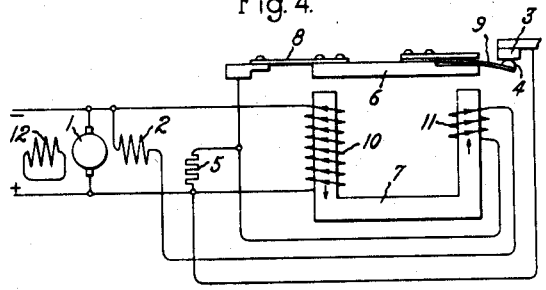
Figure 5:
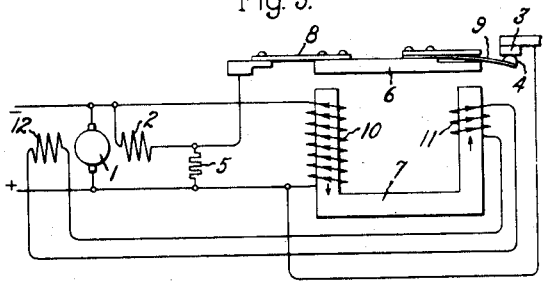
Figure 6:
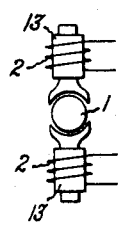
Figure 7:
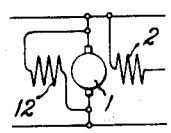
Figure 8:
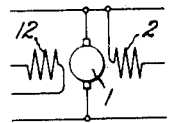

In the drawing, Fig. 1 is a diagrammatic illustration of a particular embodiment of my invention, Figs. 2 and 3 are graphs for illustrating the principle of operation of my invention, Fig. 4 illustrates a further modification of my invention, Fig. 5 illustrates diagrammatically a preferred embodiment of my invention, and Figs. 6, 7 and 8 illustrate, respectively, modified arrangements of the auxiliary circuit or winding.

Referring now to Fig. 1 of the drawing, it will be seen that I have shown therein diagrammatically an application of my invention to a voltage regulating system for a direct current generator 1 provided with a shunt field winding 2. The regulating means for generator 1 comprises, by way of example, a simple vibratory contact type voltage regulator having a set of contacts 3 and 4 which are connected across a regulating resistance 5 which is connected in series with a shunt field winding 2 of generator 1. Contact 3 is shown, as a relatively stationary contact and contact 4 is a relatively movable contact which is arranged to be moved by an electromagnet armature 6, which cooperates with an electromagnet core 7. Armature 6 is movably mounted and is preferably biased to a position whereby contact 4 engages contact 3, by any suitable means such as by a resilient spring member 8. It is also desirable to provide a resilient connection, such, for example, as thin blade spring 9, between the contact 4 and the armature 6. The reason for this is that it improves the regulator action in that it prevents contact rebound during normal operation and also, due to a wiping and rocking action of the contacts, it prevents sticking of the contacts.

The core 7 is energized by main operating winding 10 which is connected so as to respond to the voltage of generator 1 in any suitable manner, such as by connecting it directly across the terminals thereof. The regulator is also provided with anti-hunting means which is shown by way of example as an anti-hunting winding 11 connected in circuit with the contacts 3 and 4.

What I believe to be the essential structural novelty of the embodiment of my invention illustrated in Fig. 1 resides in the combination of an auxiliary winding 12 on generator 1 with the other elements described above. Winding 12 is mounted on the generator so as to be threaded by the main flux thereof and the circuit of winding 12 is a permanently closed circuit having a substantially constant resistance. As will be explained hereinafter, the interaction of the effect of winding 12 with the other elements results in an improved operation of the anti-hunting feature of the regulating system.

The general operation of the arrangement shown in Fig. 1 without windings 12 is as follows: If it be assumed that generator 1 is being driven by any suitable means (not shown) its voltage will build up in the ordinary manner thereby sending an increasing current through the main operating winding 10 and also sending an increasing current through winding 11 through the contacts 3 and 4 which are closed as shown. Winding 11 is so connected that the flux it produces aids the flux produced by the main operating winding 10. When the flux produced by both coils reaches a predetermined value armature 6 will be attracted against the biasing force of spring 8 and after a predetermined movement of armature 6 in taking up the lost motion in the resilient mounting means 9 the contact 4 will leave the contact 3. This breaks the circuit to coil 11 and unless the voltage of generator 1 is at the normal value which the regulator is set to hold, the pull of coil 10 will not be sufficient to hold the contacts separated and they will snap closed again. When the contacts are open the short circuit about the resistance 5 is broken and consequently the field current is limited by the value of the resistance 5. This action continues until the voltage of the generator is substantially normal. The action being such that whenever the contacts close they are rapidly opened again by the relatively powerful effect produced by the energization of the coil 11 and the contacts will be held open by the coil 10 until the voltage of the generator 1 drops below normal whereupon they will close, but they will again be quickly opened by the reenergization of the coil 11.

The result of the above operation is that the current in the field winding 2 when plotted against time has a saw tooth appearance as is shown in Fig. 2. Thus when the contacts close the current builds up along a transient curve determined by the constants of the circuit and when the contacts separate the current builds down along another transient determined by the constants of the field circuit including the resistance 5. This action is relatively rapid and results in the holding of an average or mean field current for any set of external operating conditions on the generator. The shaded area in Fig. 2 represents the value of the contact current which is also the current which flows through the antihunting coil 11. Were it not for the presence of the coil 11 the swings in the current, that is to say, the range between the maximum and minimum current values would be much wider and consequently objectionable fluctuations in generator voltage would be produced. This is because if coil 11 were not present the contacts would only separate when the increased pull of the main operating coil 10 attains a sufficient value to overcome the bias of spring 8, and due to the inductance of the various circuits this value of current in coil 10 would not be attained until after the voltage of the generator had exceeded the normal regulated value by an amount which in many applications cannot be tolerated.

The presence of the anti-hunting coil 11, however, produces one undesirable effect. This effect is an under-compounding effect which causes the regulator to hold a lower voltage than the normal desired regulated voltage when external conditions on the generator, such for example, as increases in load, or decreases in speed, cause the regulator to hold higher average values of current in the field winding 2. Thus, for example, at low generator speed or large loads on the generator, or both, the average current of the field winding 2 of the generator will have to be higher than at other times in order to hold normal voltage and this means that the current values in coil 11 will be higher than normally. The result is that the pull of coil 11 becomes stronger than normal thereby causing armature 6 to be more violently attracted to the core 7, whereby due to its inertia the contacts will remain separated for a longer time than normal. This action may also be viewed in another way. Thus, as the average energization of the coil 11 increases, the total average flux in core 7 tends to increase but the operation of all regulators of the vibratory type, such as described in Fig. 1, is to maintain constant average flux in the core, and as a result the regulator must act as though the voltage is higher than it actually is thereby causing a reduction in the average current in coil 10 corresponding to an actual reduction in average voltage in order to maintain constant average flux in the core 7.

The special operation of my regulating system due to the presence of the winding 12 can best be illustrated by reference to Fig. 3. This figure shows a graph or plot of the current in the windings 2 and 12 during the operation of the regulator. It is difficult to explain in a simple manner the shape of the curves, but that they have these shapes has been demonstrated repeatedly by oscillographic methods, as well as by theoretical considerations. As shown, the curve labeled 2 is the curve of the current in the winding 2 and the curve labeled 12 is the curve of the transient current induced in the substantially short circuited winding 12. It will be seen that the average current in the winding 12 is zero, as it should be, because there is no constant or direct current source of potential in the circuit of this winding. It will also be observed that the maximum and minimum values of current in the winding 2 vary widely and attain almost their absolute maximum and minimum values represented respectively by conditions of permanent short circuit of resistance 5 and permanent connection of this resistance in the circuit.

The practical effect of this type of shunt field current characteristic is that the maximum and minimum current values in the field winding 2 do not vary appreciably with changes in the average value of field current. The changes in average value of field current are attained by changing the ratio of time during which the current is at its high value to when it is at its low value. As a result, the degree of energization of coil 11 is substantially unaffected by changes in the average value of the current in field winding 2, and the degree of the current in the coil 11 remains substantially constant throughout the range of regulator operation. Therefore, the coil 11 does not produce the hitherto unavoidable under-compounding effect and the regulator holds substantially constant the value of the regulated condition, in this case voltage, throughout the entire range of regulator operation.

The anti-hunting coil 11 may be connected in a great variety of ways all of which will retain the benefits of my invention. Thus, for example, the winding 11 may be connected in series or in parallel with the field winding 2 and as shown in Fig. 4, the winding 11 is connected in series relation with the field winding 2. With such a connection the pull of coil 11 will increase and snap the contacts open almost as soon as they close because upon closure of the contacts resistance 5 is short circuited and the current in the field winding 2 builds up very rapidly as is shown in Fig. 3. This current flowing through the coil 11 will produce the increase in flux in core 7 which causes the armature 6 to be attracted thereto and separate the contacts. In this arrangement the maximum and minimum values of current in coil 11 remain substantially the same throughout the range of regulated operation and consequently the under-compounding effect of this coil is minimized.

Fig. 5 shows another modification, which is the one I at present prefer. This figure differs from the preceding figures in that the coil 11 is connected directly across the winding 12 and is energized solely therefrom. With such an arrangement, as soon as the contacts close the transient current induced in the winding 12 by the increase in current in the winding 2 will flow through the coil 11 and the connections are such that the current flow produced by this transient is in a direction to aid the flux produced by coil 10, as in the other figures. As a result, as soon as the contacts close there is a great increase in current in coil 11 thereby snapping the contacts open relatively quickly. As has been previously mentioned, the average current in the winding 12 is zero regardless of what the average value of the current is in the field winding 2. Consequently the arrangement of Fig. 5 entirely eliminates the under-compounding effect because not only are the maximum and minimum values of current in the anti-hunting coil 11 substantially unchanged throughout the regulator operation but also the average value of current in the winding 11 remains independent of changes in the average value of the current in the field winding 2. Consequently, the arrangement of Fig. 5 is one in which no under-compounding effect at all is produced.

The auxiliary circuit of winding 12 need not necessarily be in the form shown in Figs. 1, 4 and 5. Thus for example in Fig. 6, the poles of the generator 1 are provided with sleeves of conducting material 13, made of any suitable material, such for example, as copper. These copper sleeves act as short circuited turns on the field poles which are threaded by the flux of the generator and produce an effect equivalent to the effect produced by winding 12 in Figs. 1 and 4. Also, as shown in Fig. 7, it is not necessary that the winding 12 be short circuited upon itself as in Figs. 1 and 4, and if desired, this winding may be connected across the armature 1, which has a relatively low resistance. Similarly, winding 12 may be separately excited from any suitable source, such as a battery, for example, as is shown in Fig. 8 where the winding 12 is indicated as being separately excited. With such an arrangement applied to Fig. 5 the winding 11 would have a constant base energization corresponding to the current produced by the separate source of excitation, but the fluctuations or changes in the current would remain the same throughout the range of regulator operation. Consequently the average current would remain constant throughout the range of regulator operation.

Although I have shown and described particular embodiments of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a dynamo-electric machine, an excitation controlling circuit therefor, a vibratory regulator therefor, an anti-hunting coil on said regulator connected to be energized by a current whose value varies with variations in the energization of said excitation controlling circuit, and means for minimizing the under-compounding effect of said anti-hunting winding comprising a substantially constant resistance circuit which is relatively closely inductively coupled to said excitation controlling circuit.

2. In combination, a direct current generator having a shunt field winding, a regulating resistance in circuit with said field winding, a vibratory contact voltage regulator for said generator having its contacts connected to control the effective value of said resistance, said regulator having a relatively fixed contact and a relatively movable contact mounted on an electromagnet armature, an electromagnet core cooperating with said armature and having an operating winding thereon connected to be responsive to the voltage of said generator, a second winding on said core arranged to be energized from said generator by a normally relatively widely fluctuating current controlled by said regulator contacts in a manner to aid the action of said operating winding when the contacts of said regulator are closed, and a closed electric circuit of relatively low constant resistance inductively coupled with the shunt field winding of said generator.

3. In combination, a generator, a vibratory contact regulator for said generator, an anti-hunting coil for said regulator connected in circuit with the contacts thereof, and an auxiliary field winding on said generator having a circuit of substantially constant resistance.

4. In combination, a generator having a shunt field winding, a vibratory contact regulator for said generator, an anti-hunting coil for said regulator connected in circuit with said shunt field winding, and an auxiliary field winding on said generator having a substantially constant resistance circuit.

5. In combination, a generator, an electromagnetically operated vibratory contact regulator for said generator, an anti-hunting coil on said regulator, and an auxiliary field winding on said generator connected in circuit with said antihunting coil, the resistance of the circuit including said auxiliary field winding and said anti-hunting winding being fixed.

6. In combination, a direct current generator having a shunt field winding, a vibratory contact voltage regulator for said generator, said generator having a relatively fixed contact and a relatively movable contact arranged to be operated by an electromagnet armature, an electromagnet core cooperating with said armature and having a generator voltage responsive operating winding thereon, a second winding thereon, a second field winding on said generator, and connections for causing the transient current induced in said second field winding as a result of the closure of the contacts of said regulator to energize the second winding on said core in such a direction as to cause said winding to aid the effect of said voltage responsive winding.

BERNARD M. CAIN.